US005710878A

United States Patent [19]

McCoy et al.

[11] Patent Number: 5,710,878
[45] Date of Patent: Jan. 20, 1998

[54] METHOD FOR FACILITATING MATERIAL APPLICATION FOR A GROUP OF OBJECTS OF A COMPUTER GRAPHIC

[76] Inventors: David Scott McCoy, 406 Langford Dr., Bollingbrook, Ill. 60440; John-Mark Albertson, 1222 Degener Ave., Elmhurst, Ill. 60126

[21] Appl. No.: 480,649

[22] Filed: Jun. 7, 1995

[51] Int. Cl.⁶ .................................................. G06T 15/00
[52] U.S. Cl. .......................... 395/129; 395/119; 395/130; 395/131; 395/132
[58] Field of Search .................................. 395/119, 133, 395/129–32

[56] References Cited

U.S. PATENT DOCUMENTS 5,550,960  8/1996  Shirman et al. ..................... 395/130

OTHER PUBLICATIONS

P. Wisskirchen, "Object–Oriented Graphics", *Springer–Verlag, Berlin Heidelberg*, 1990, pp. 12–18, 90–101, 106–109, 130–139, 160–169 and 178–200.

Hamit, F., Virtual Reality and the Exploration of Cyberspace, 1993, Sams Publishing, Indiana.

Watt, A., Fundamentals of Three–Dimensional Computer Graphics, 1989, Addison–Wesley Publishers Ltd., England.

Newman, W.M. and Sproull, R.F., Principles of Interactive Computer Graphics, Second Edition, 1979, McGraw-Hill, Inc.

*Primary Examiner*—Joseph H. Feild
*Assistant Examiner*—Rudolph Buchel

[57] ABSTRACT

A method for collecting, managing, manipulating, and checking data during construction of a virtual environment, and automatically re-processing the subset of data necessary to produce a resource for use by a simulation program, is provided. This method provides for the repeated application of a designated material to commonly designated elements of multiple objects. Once the material has been designated to be applied to a particular element of an object, application to other objects is facilitated by designating the common element. This method significantly reduces the amount of repetitive artist labor related to iterated operations performed and features improved error detection and indication.

20 Claims, 11 Drawing Sheets

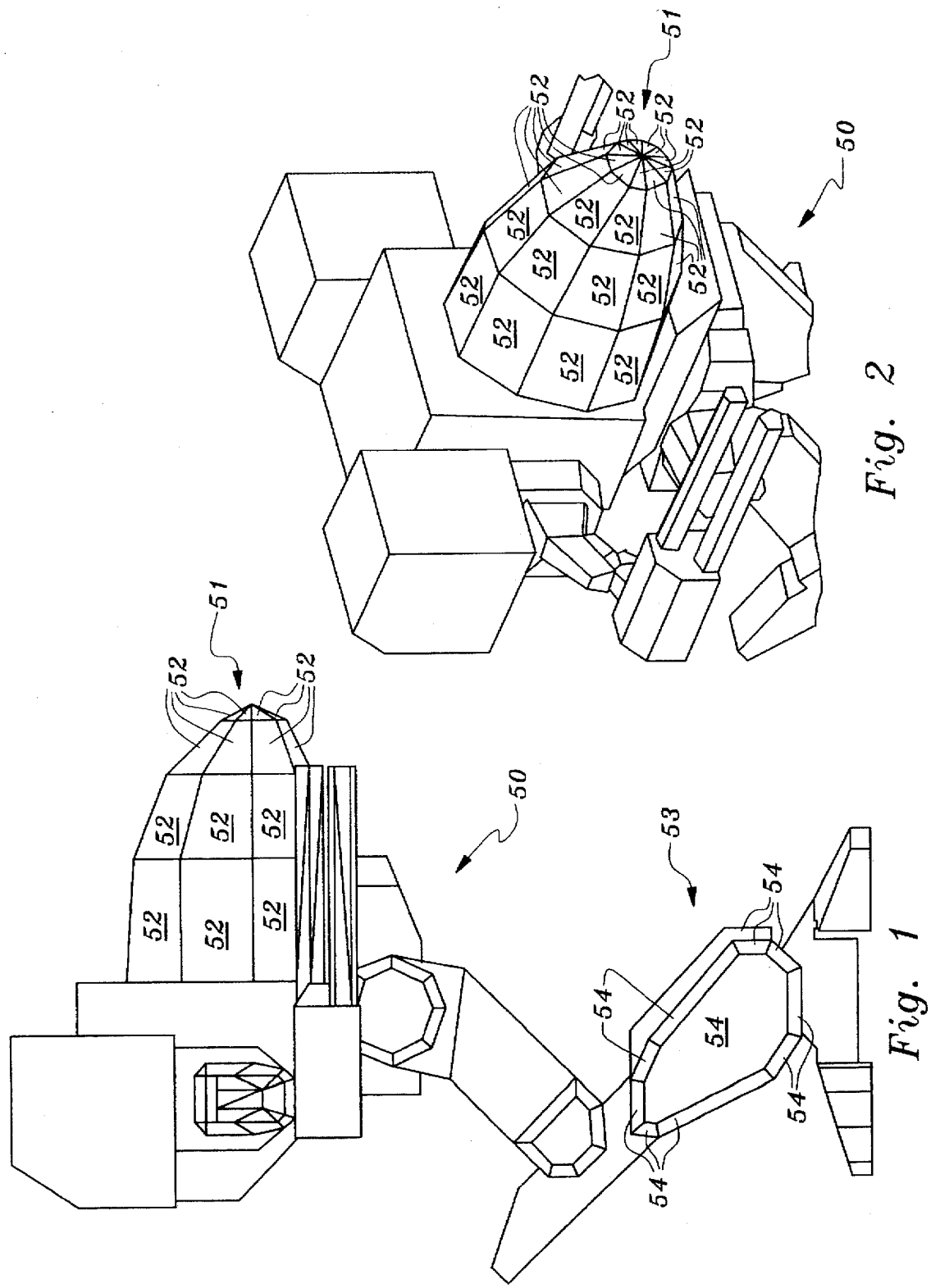

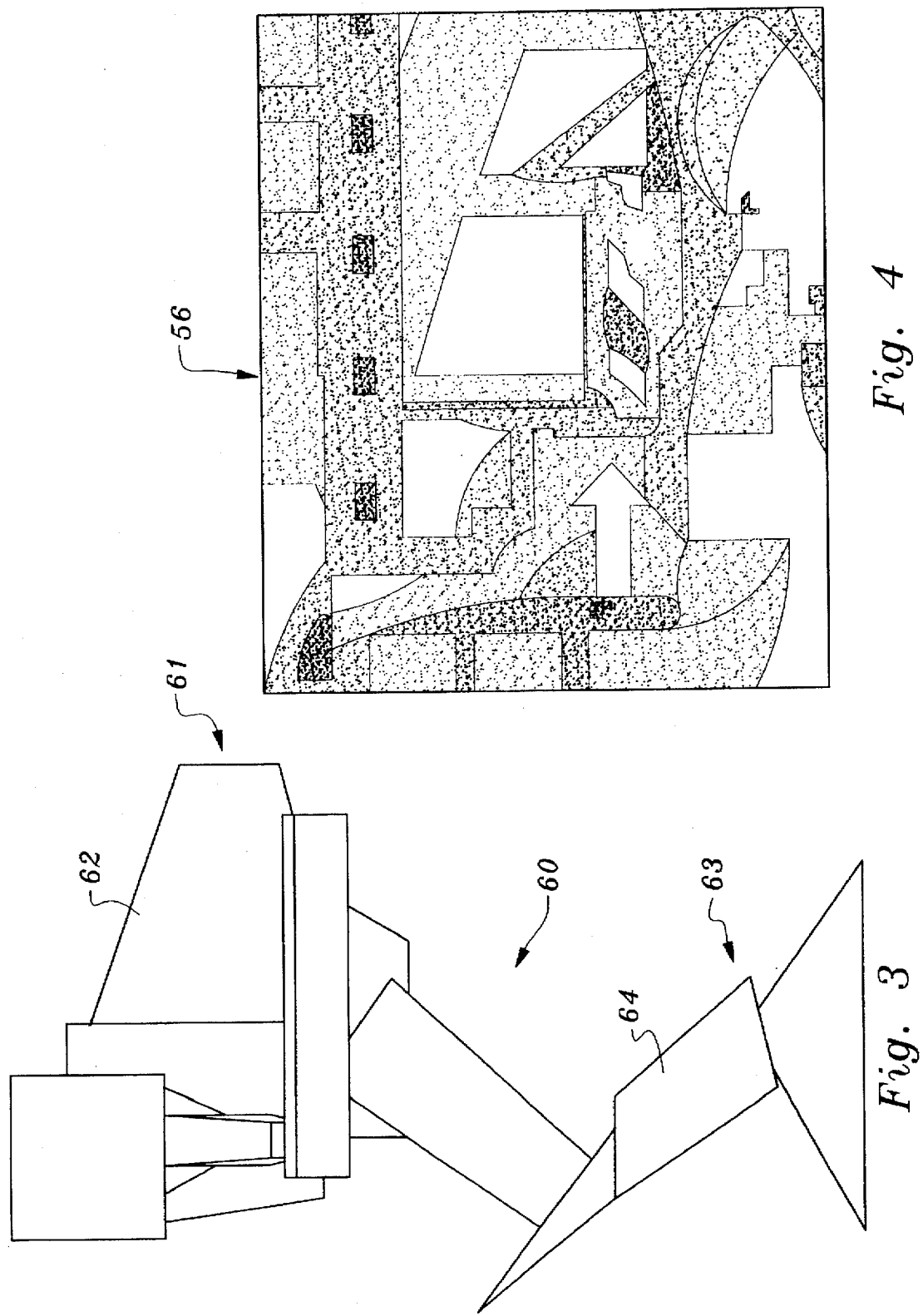

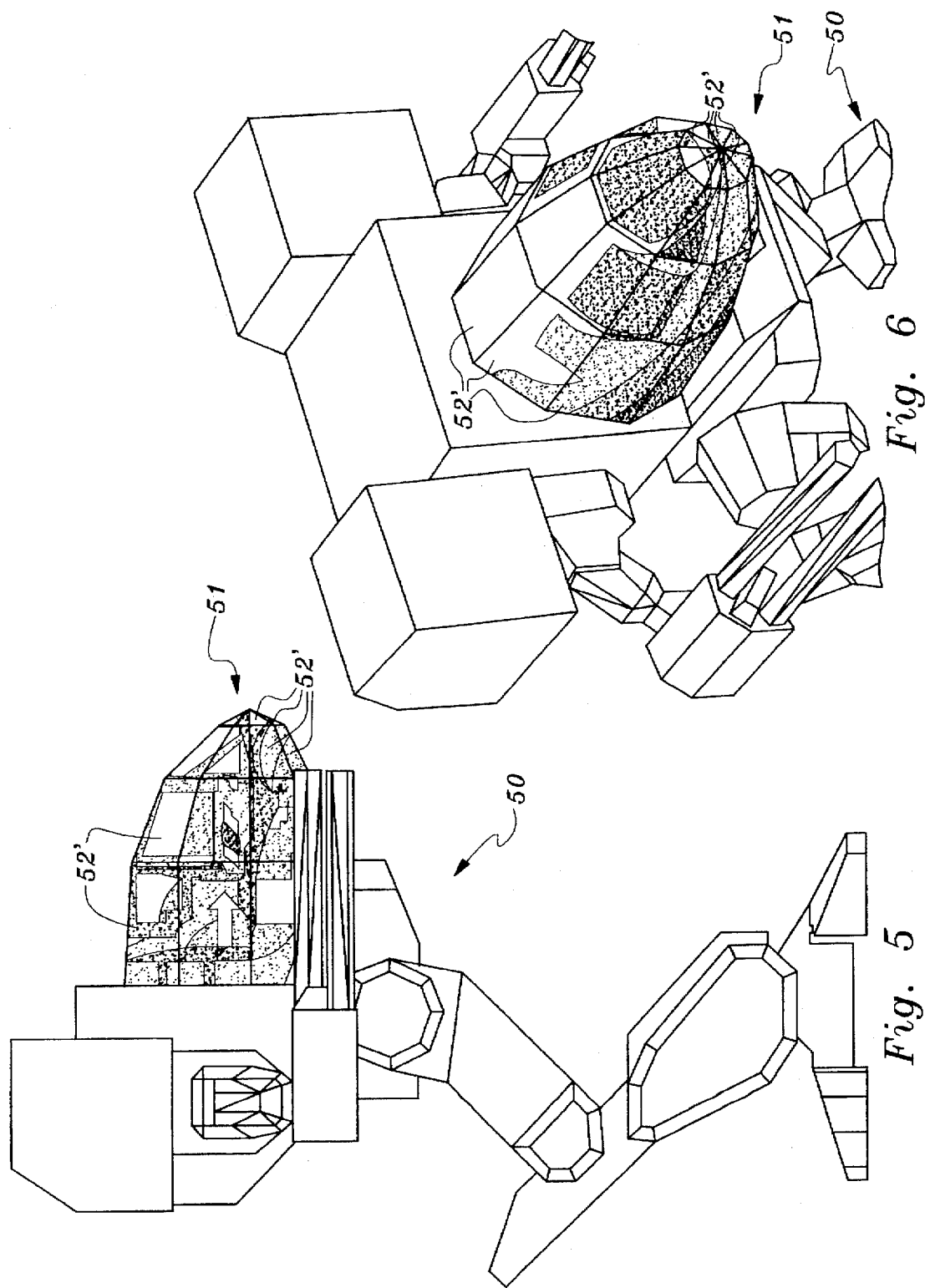

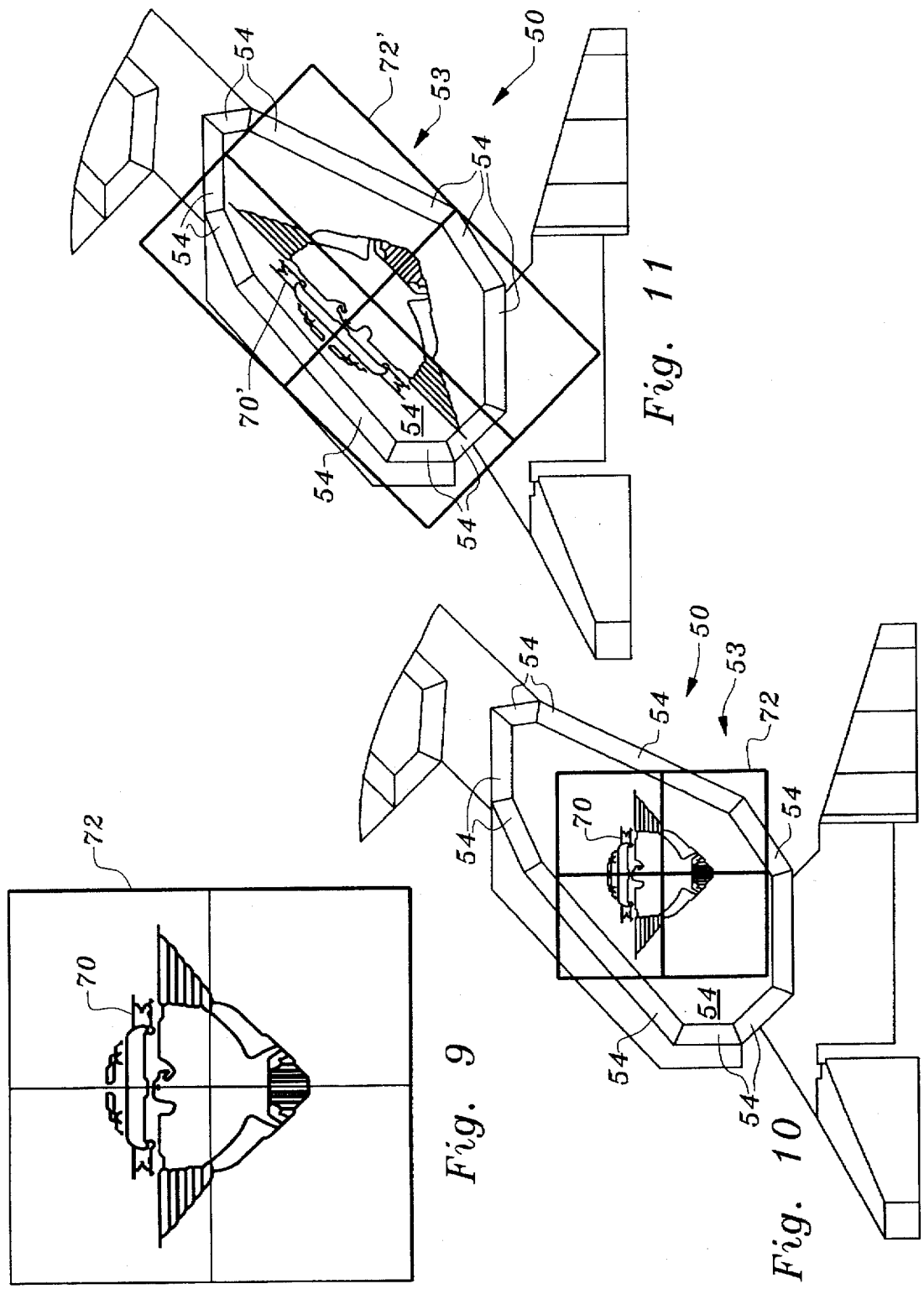

METHOD FOR FACILITATING MATERIAL APPLICATION FOR A GROUP OF OBJECTS OF A COMPUTER GRAPHIC

A portion of this disclosure of this patent document contains material which is subject to copyright protection. The copyright owner does not object to the reproduction of the parent document or the patent disclosure, as it appears in the Patent and Trademark Office patent files or records, but otherwise reserves all copyright rights therein whatsoever.

FIELD OF THE INVENTION

The present invention relates generally to a system for collecting, managing, manipulating, and checking data during construction of a virtual environment.

BACKGROUND OF THE INVENTION

In recent years, with the increased processor power and speed of the computer, the use of three-dimensional computer graphics has exploded into application areas as diverse as entertainment and medicine. Using three-dimensional computer graphics, it is now possible to create computer generated simulation environments which allow for human-computer interaction in real time—taking the user far beyond familiar limits, a computer generated "virtual" environment is treated as if it were real. Interacting with the computer generated simulation environment in real time is known as virtual reality.

A simulation environment is composed of many types of data from many sources. With virtual reality systems, the artist strives to render three-dimensional objects in two-dimensional screen space such that reality is mimicked at an acceptable level. Sounds and images are traditional media components. Three-dimensional computer models and joint animation sequences are exemplary of the more recent media components which comprise the databases for a virtual environment. Still more data is needed to tie these otherwise unrelated components of sound and image together—to link them into a coherent whole and make them accessible to the real time simulation program which will bring the simulation environment to life.

To create a three-dimensional virtual environment, efficiency in computer graphic generation is extremely important. Given the constraints of the hardware utilized, efficiency is typically content dependent; the more expressive the graphics, the longer the graphics take for an artist to generate. Typically, those individuals producing the three-dimensional animation necessary for a virtual environment have time constraints imposed for generation of the finished products. These time constraints are a function of the hardware available, the rendering techniques used and the budget.

Beyond the efficiency constraints imposed on the creation of a simulation environment, the higher the degree of reality sought, the greater the processing demands. This is of particular concern for the real time systems of virtual reality. Simpler models of computer-generated imagery are used for flight-simulators and other real time virtual reality applications (as opposed to non-real time applications such as the computer graphics techniques employed for making movies or television commercials). In addition to presentation of the computer-generated imagery, these systems must use processing power for real time responses, for example, changes in the user's orientation in the simulation environment, and processes and events (flight dynamics, collisions, enemy attack, etc.) that happen within the simulation environment. Even with multiple processors, the prodigious demands of these systems constrain the accurate representation of the computer-generated imagery models.

In order to create more expressive simulation environments, engineers and artists strive to develop new, cheaper, more efficient and more powerful means and representations to achieve improved realism in sound, graphics and animation. In the past, artists creating three-dimensional simulation environments often criticized the crude tools and design capabilities at their disposal, and the limitations of human-computer interaction. Frequently, not unlike many art media, the tools require mastery, are labor intensive, and often awkward. Unlike many art media, the tools are not adapted from other purposes, but are constructed specially for their purpose and are easily modified.

Creation of a Simulation Environment

Computer graphics are generated on two-dimensional computer viewing screen located at a workstation. Three-dimensional coordinate systems are projected onto the two-dimensional computer viewing screen and are manipulated to create a three-dimensional virtual environment.

A popular method for representing an object within the three-dimensional coordinate system of a virtual environment is the polygon mesh model. Here, the polygon mesh model is used to represent three-dimensional modeling methods by way of example and not limitation. Other types of systems for generation of three-dimensional modeling may be used without exceeding the scope of the principles of the present invention.

A polygon mesh model consists of a number of vertices designated within the 3D coordinate space of the virtual environment. The vertices are connected to form polygons, and these polygons are connected hierarchically into complete objects. This form of representation is either exact or an approximation depending on the nature of the object. For example, a cube can be represented exactly by six squares. However, a sphere, because of its curved surface, can only be approximated with a number of polygons. Generally, the number of polygons used in the approximation determines the accuracy of the object representation. The greater the number of polygons, the better the accuracy of the representation. However, with increased accuracy comes increased modeling costs, storage, and rendering costs.

Once a three-dimensional object has been represented with polygons, it is almost always further enhanced using techniques to apply various materials to the two dimensional surface of the polygons. Materials are a collection of attributes used to modify the appearance of a polygon when it is displayed by a computer graphics system. Color, light reflection models (such as Gouraud or Phong shading, which simulate the way light interacts with a real surface), and texture mapping, bump mapping and environment mapping are all examples of techniques which may be used either singly or combined to specify materials used to enhance the surfaces of a polygon mesh object. Application of a material results in parameters to be added to the data of the polygon particular to the included materials techniques. For example, a polygon may contain a datum indicating it is a certain shade of blue; its vertices may each include data for a normal (a vector perpendicular to the tangent plane of the surface being approximated by polygons at the vertex).

Texture mapping, another example of a materials application, is the process of transforming a 2D texture image onto the surface of a three-dimensional object. The use of the word "texture" is somewhat misleading;

historically, it related to adding spatial modulation to brightness or color over the surface of a polygon to suggest that the object was not a smooth object (roughening the appearance). In more recent times, texture mapping consists of placing a "texture", such as a color motif, noise pattern, or a digitized image (phototexture), on a polygon surface. Texture mapping enables objects to exhibit different (and often complex) surface properties without requiring the breakdown of each surface into multiple polygons and the separate treatment of each of these separate polygons. For example, modeling a tree by texturing it with a photograph of a tree is much simpler than a model with a polygon representing each distinct leaf and branch.

To facilitate the creation of a virtual environment, the artist of today has an array of computer graphics tools, both hardware and software, at his disposal. These computer graphics tools generally fall into three categories which implement the common techniques for modeling in a virtual environment: three-dimensional (3D) tools, two-dimensional (2D) tools and a third category of tool which provides for the combining of these modeling techniques.

The 3D tools facilitate and provide for the building of three-dimensional virtual environments using, for example, the polygon mesh model. The 3D tools define the geometry of the objects in the 3D virtual environment.

The 2D tools define polygon surface materials. Since the 2D tools allow the artist to designate materials in the form of color and images, such as textures, for the 2D surface of the polygon mesh objects, the 2D tools are generally referred to as "paint systems."

The third category of tool provides for the linking of the objects of the 3D virtual environment with the 2D materials to be applied to them. Various tools now commercially available may combine one or more of these three tool types.

An artist will use many computer graphics tools in the course of creating a work piece such as a virtual environment. For instance, in constructing a 3D object for use in a computer simulation, a modeling tool would be used to construct the geometry of an object from a number of polygons.

Separate from creation of the 3D objects, another set of tools is used by the artist for creating a data base of various materials which define the surface qualities of that object. These various material are referred together to as the library of materials for that particular object. These materials would include, for example, colors, images and other finishes to be used with the object.

Once the artist has generated the 3D objects, and his library of materials, he uses another tool to indicate and association and alignment of a material with a polygon or group of polygons in the object. This tool applies materials to specified polygons in the object by storing within each polygon (within its data structure) or such of its vertices as appropriate data representative of the resulting attachment of material (e.g., a polygon might be tagged with a particular color and lighting model, vertices might be tagged with a 2D coordinate representing a point in a texture image, etc.).

Each of the three operations: defining geometry, creating materials, and applying materials, is an aesthetic process. In the first two operations, the artist produces geometry data (which can be stored as files), and the materials data (which also can be stored as files and grouped together as a materials library), respectively. The geometry files and materials files are not themselves end products but are intermediate data files requiring further operation for their use, that of linking the geometry files to their appropriate materials files, as described in the application tool, to make them useful. The application process, which provides for the modifying and applying of materials to the polygon mesh object, results in a final data file that comprises an enhanced object geometry. This enhanced object data, normals, texture image coordinates, references to specific texture images (The texture image itself is usually stored separately so that many objects may share it.), etc. The composite result is a "finished" model stored as a "finished" data file. In some instances, the geometry file is constructed by having the additional data added to it so that it becomes the finished data file. When this procedure is used, the original geometry file is usually not preserved.

The process of generating a finished data file is highly artist's labor intensive. Existing source data files containing images, models, colors, textures, etc. may be available to the artist, or the artist may create objects and materials anew and place them in source data files. Typically, an artist creates an object and stores it as a geometry file. The object is manipulated and viewed from various positions within the 3D virtual environment to insure an aesthetic result. Similarly, the artist creates materials and stores them in the materials data files. Each material is added to a library of materials data files. For the application procedure, the material to be applied to the object is first selected. Then, the artist specifies parameters for the application of the material to the object such that the material is appropriately stretched, compressed, distorted, and/or otherwise modified as it is applied to the object. In this manner, the object data structure is modified appropriately as the material is applied (linked) to the object to create the finished data file. The artist then views the finished object from various angles to confirm the aesthetic appearance. If the artist is not satisfied, the material is removed and the application procedure repeated until the artist is satisfied with the resulting appearance. All of the by-hand art manipulation is thus linked together to produce a valid, machine ready art resource as the finished data file.

Prior Art Collection Management and Checking Methods

In the prior art, creation, collection, management, and checking methods for the intermediate data files were highly artist's labor intensive. As previously described, they were by-hand processes. So, too, was the process of linking the intermediate data files (as exemplified by the texture application process) to create the finished data files representative of a virtual environment. Thereafter, error checking consisted of visual inspection of the finished objects. Errors consisted of flaws in specific elements of a particular object, as well as incongruencies between elements and between objects. The errors may be technical (i.e., they would cause the data to fail in use), or aesthetic. These errors can, for example, be caused by mistakes in the hand-encoding of the artist (e.g., colinear vertices in a polygon, improper ordering of vertices in a polygon, non-coplanar vertices in a polygon, etc.), or simply inclusion of out-of-date information used for geometry files, materials files or their combination in the finished data file (e.g. using a placeholder geometry or material when the final exists, including version 6 geometry when version 7 was desired, etc.).

Often, if the geometry of an object needed to be re-edited, the materials information in the finished data file would not accurately survive the re-editing process. The material would need to be reapplied to the new object geometry.

In addition, if an error was found in the materials application after the finished data file had been generated, correcting that flaw would usually require modification to the materials file, and reapplying (relinking) the material to the original geometry.

Further, if several objects of a similar or related nature were found to have flaws or errors, or the same object exhibited in a different manner (e.g. geometry representing the same object but at a different level-of-detail) needed to have materials modified or applied in a like or similar manner, the manual process would be repeated for each object.

Note that some known software packages, e.g. Advanced Visualizer™, have features which allow automatic construction of objects of lower detail. They incorporate algorithms which can reduce the number of polygons in an object according to some optimization metric. In such algorithms, adjacent polygons with the same or similar materials applied are candidates for combination and simplification, and if so reduced, no reapplication of the material is required—the material remains attached. However, the technique is limited and many artists reject the aesthetics of the automatic simplification algorithms and prefer to perform the reduction manually. Since the artist understands the artistic intent of the object and each of its polygons, he is able to make a more informed and acceptable decision for the reduction of detail.

Even with available tools and other resources, the data path from origination (creation or source data file), to intermediate data file, to finished data file as the final result continues to be complex, convoluted, managed by hand, and fraught with opportunities for error.

Assuming errors have been avoided, a finished data file is still the result of much repetitive manual manipulation and cross-checking; it is not readily amenable to last minute changes in the source data files and/or intermediate data files—the construction process is simply too long. Moreover, since the ultimate quality of a computer graphics product is often directly proportional to the number of revisions it undergoes during its transition from source data file to intermediate data file to finished data file, it is of paramount importance that the duration of this construction and revision process be minimized to permit sufficient time for error checking and revisions.

OBJECTS AND SUMMARY OF THE INVENTION

In the present invention, a means for collecting, managing, manipulating, and annotating pertinent data during construction of a simulation environment including a virtual environment, sound, etc., is provided.

A new and novel method for capturing an artistic manipulation of a 3D object (such as the texturing process), storing the parameters of that manipulation, altering the object (or using a level-of-detail simplification, variation, or vaguely similar object), and reapplying the same manipulations to it automatically is described.

The present invention overcomes the drawbacks of the prior art with respect to collection, management, and manipulation methods for data representative of a virtual environment. When constructing a virtual environment, the present invention provides for a new and novel process of linking the intermediate data files to create the finished data files representative of a virtual environment. Then, if the geometry of an object or a material is altered, the automated reapplication process of the present invention is sufficient to complete the new finished data file. Further, if material applications of a similar nature are required, application of materials to subsequent objects is automatic. This allows for ease of creation of subsequent models which represent the same object at a different level of detail. It is also used for a collection of different objects (e.g. vehicles in a military regiment) requiring a similar treatment to each, such as a common paint scheme.

In another embodiment of the present invention, the operations themselves can be manipulated by collecting the operations and treating them as data also. For example, the set of commands that applies materials to the left side of an object can be automatically altered to appropriately apply the materials to the right side as well. Operations which apply the materials at one level of detail may be automatically altered to appropriately apply materials at other levels of detail (for example, automatically selecting a lower-spatial-frequency version of a material texture image).

It is the object of this invention to capture the individual applications of materials to elements in order to provide for automated reapplication.

An additional object of this invention to minimize or eliminate redundant manual processes by using techniques to capture manipulations for later reuse.

It is an object of the present invention to eliminate the need for a person to manually apply each material to a named part of a object.

Another object of the present invention is to insure accurate, coherent treatment of sets of related objects.

It is yet another object of this invention to perform tests on all input data to minimize the potential for an error in the data which would cause the simulation program to crash or exhibit undesirable anomolies.

It is a related object of this invention to provide the artist with an indication of the cause of potential errors in the data which would result in the crash of the simulation program.

It is still another object of this invention to be compatible with a majority of commercially available off-the-shelf data creation tools and operating systems by making use of commonly available features and mechanisms.

Finally, it is an object of this invention to maximize the number of iterations possible on a virtual environment database in a given time, as this is a primary activity for increasing the ultimate quality of the simulation product.

These and other features and advantages of the invention will be more readily apparent upon reading the following description of a preferred exemplified embodiment of the invention and upon reference to the accompanying drawings wherein.

BRIEF DESCRIPTION OF THE DRAWINGS

The aspects of the present invention will be apparent upon consideration of the following detailed description taken in conjunction with the accompanying drawings, in which like reference characters refer to like parts throughout, and in which:

FIG. 1 depicts a side view of a three dimensional robot with a protruding nose, the protruding nose being an exemplary named group of one or more polygons of a three dimensional object, said object rendered in polygons for a virtual environment, for use with one embodiment of the present invention;

FIG. 2 depicts a perspective view of a top-half portion of a three dimensional robot with a protruding nose, the protruding nose being an exemplary named group of one or more polygons of a three dimensional object, said object rendered in polygons for a virtual environment, for use with one embodiment of the present invention;

FIG. 3 depicts a side view of the exemplary three dimensional robot of FIG. 1 as a distant object, simplified by using fewer polygons, for use with one embodiment of the present invention;

FIG. 4 illustrates a two-dimensional texture image of a robot cockpit, shown flat and unapplied, which is an exemplary material for use in accordance with the principles of the present invention;

FIG. 5 illustrates the exemplary cockpit texture image of FIG. 4 projected and applied onto the nose of the three dimensional robot of FIG. 1 in accordance with the principles of the present invention;

FIG. 6 shows a perspective view of a top-half portion of a three dimensional robot with a protruding nose of FIG. 2, and illustrates the exemplary cockpit texture of FIG. 4, applied from the side orientation as in FIG. 5, in accordance with the principles of the present invention;

FIG. 9 depicts a two-dimensional texture image of an eagle, shown flat and unapplied, which is an exemplary material for use in accordance with the principles of the present invention;

FIG. 10 illustrates the exemplary texture image of an eagle of FIG. 9 projected onto an ankle joint, shown in side view, of an exemplary three dimensional robot in accordance with the principles of the present invention;

FIG. 11 illustrates the exemplary texture image of an eagle of FIG. 9, rotated and stretched, and projected onto an ankle joint and applied, shown in side view, of a three dimensional robot in accordance with the principles of the present invention;

Figure 8:
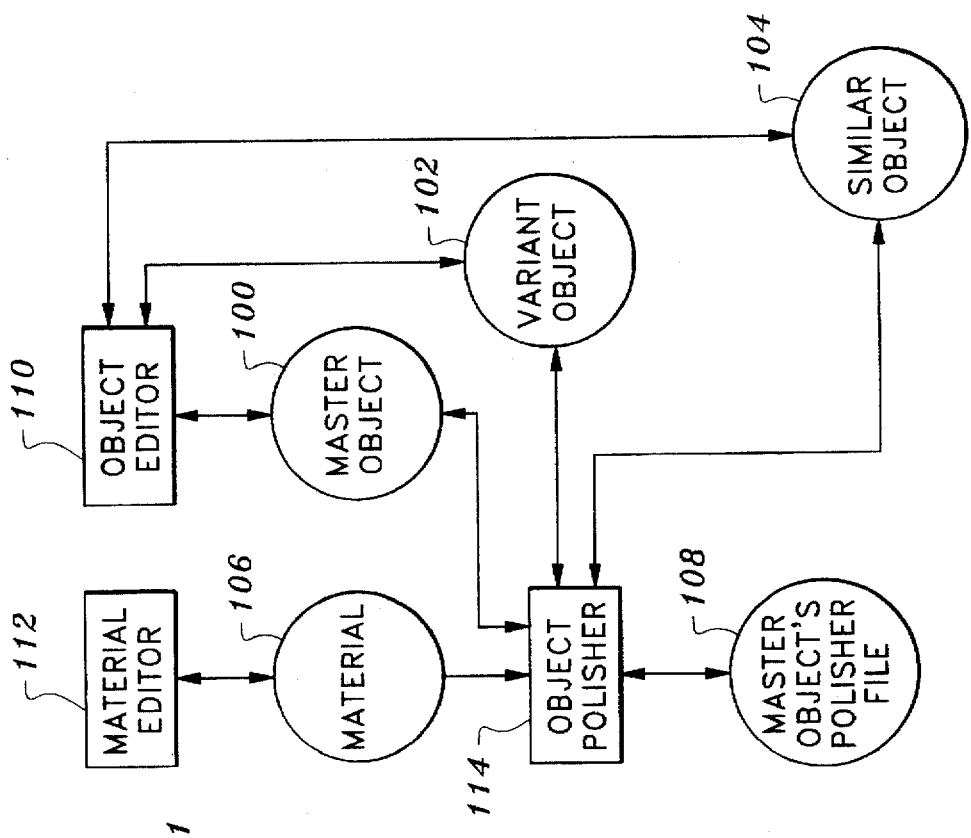
FIG. 8 is an exemplary embodiment of a system of the present invention illustrated by a flow diagram showing the relationship between the major components, and the operation of each of them.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

The method and system of the present invention can be implemented using a general purpose computer configured to generate a virtual environment by rendering objects using one or more polygons and further having the capability to overlay polygons with materials such as textures and the like.

In a virtual environment, objects may be repeated in order to reduce the effort an artist would otherwise expend to produce a virtual environment where every object is unique. An identical repeat of an object is called an instance of the object. It is also possible to have objects in a virtual environment, although varied in shape and size, which are similar, e.g., different types of trees. These similar objects typically have similar components. The components are comprised of groups of one or more polygons, which are typically given names, (e.g. trunk, foliage). A named group is usually found to be a common component among several similar objects.

Referring to the drawings and more particularly to FIGS. 1 and 2, there is shown a 3D object 50 rendered with polygons of the form of a robot. Such an object is exemplary of object rendered by a computer graphics artist for a virtual environment. FIG. 1 shows the robot 50 from a side view. FIG. 2 is a perspective view of the top half of the robot 50. In FIGS. 1 and 2, the robot 50 is comprised of polygons. Groups of one or more polygons are designated with group names. For example, the named group of polygons designated as the nose 51 is comprised of all of the polygons 52, some not shown, which make up the nose 51. Referring back to FIG. 1, near the base of the robot 50 there is another exemplary named group, the ankle joint 53. The ankle joint 53 is comprised of all polygons 54, some not shown, including those of both legs.

In FIG. 3, the robot 50 of FIG. 1 is shown after it has been simplified to a minimum detail polygon model object. With the simplification procedure, the level-of-detail is reduced. Typically, the simplification procedure decreases the number of polygons used to create an object. This technique is used to decrease the amount of computing power necessary to display objects when, for example, the are positioned at a distance in the virtual environment and the level-of-detail needed for realism is substantially reduced. As can be seen from FIG. 3, the minimum detail robot 60 is made up of much fewer polygons than the robot 50 of FIGS. 1 and 2. The number of polygons 62 of the nose 61 for the robot 60 is significantly less than that for the nose 51 of the robot 50. There are also fewer polygons 64 which comprise the ankle joint 63 than there are polygons 54 for the ankle joint 53 of the robot 50. This minimum detail robot 60 requires less computer computation to generate and will be used by an artist in a virtual environment for viewing the robot 50 at a distance (where detail is less important since it would not be seen).

Once a 3D object, such as the robot 50 of FIGS. 1 and 2 has been rendered in polygons by a computer graphics artist, and the named groups of the object are defined, the computer graphics artist then applies 2D materials to the surfaces of the polygons. The artist may create the material and place it in the source data file, or select the material from an existing source data file. The cockpit texture 56 shown in FIG. 4 is exemplary of a material which would be placed on the surface of a 3D object. The initial selection and placement of the cockpit texture 56 on the robot 50 is an operation performed by the artist.

Referring now to FIGS. 5 and 6, there is shown the robot 50 having the texture 56 applied. The cockpit texture 56 has been projected from the side orientation shown in FIG. 5 onto the named group of polygons 51 comprising the nose of robot 50. With the application of the cockpit texture 56, each of polygons in the nose 51 is now a finished polygon 52' and has a portion of the cockpit texture 56 attached to its 2D surface. The information describing the artist's input (further described below) that resulted this application of the cockpit texture 56 onto the nose 51 is stored and may be referenced by referring to the named group comprising the nose 51, to which it is attached.

Note that in FIG. 6, it is shown that the texture 56 having been projected and applied from the robot's 50 right side view as shown in FIG. 5, projects through the polygons on the right side of nose 51 to be applied also to the polygons on the left side of nose 51, as they were selected also. It is within the scope of the present invention to cause those polygons opposite the projection view to not have a material applied, however, that effect can also be achieved by splitting the named group of polygons into two named groups, one for each side of the nose 51, and selecting only one at a time.

Figure 7:
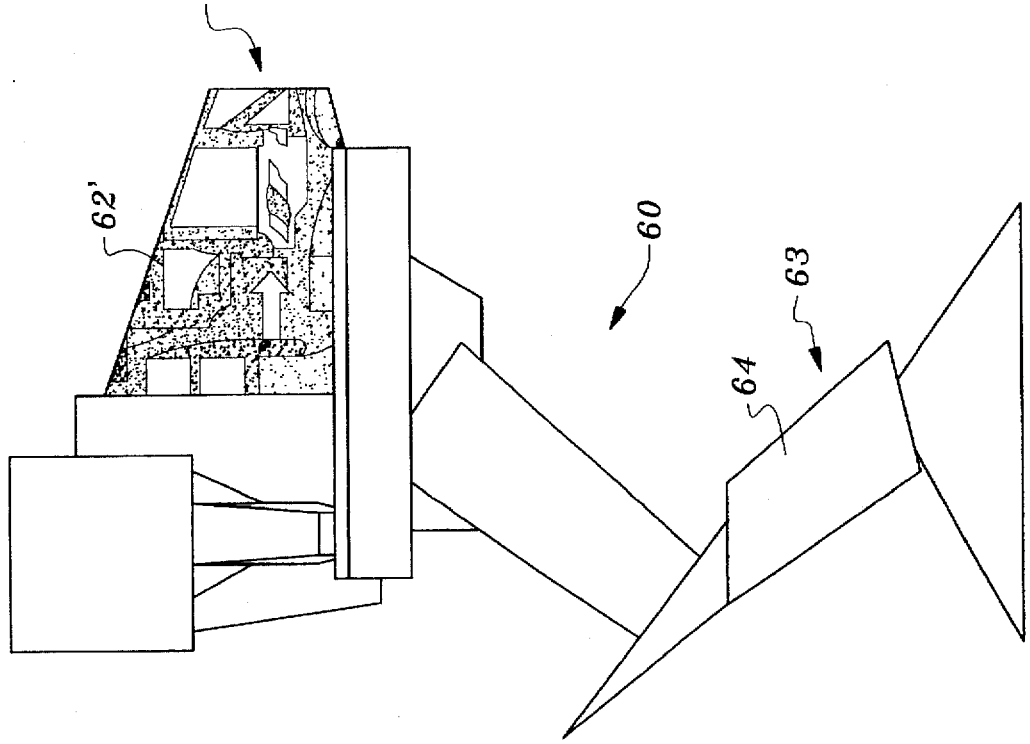
FIG. 7 illustrates the exemplary cockpit texture of FIG. 4 projected onto the simplified three dimensional robot of FIG. 3 in the same relative orientation as illustrated in FIG. 5, in accordance with the principles of the present invention.

After designating the named group for attachment of a particular material, all subsequent attachments to a similarly named group can occur automatically. The geometry of the robot 50 may be altered, but as long as the cockpit texture 56 has been designated to be attached to a named geometry, such as the nose 51, after each subsequent modification to the geometry of the nose 51, the computer can reapply the cockpit texture 56 without the need for the artist to do so. In addition, automated application of the cockpit texture 56 to other named groups having the same designation, i.e., designated as a "nose" on another object is exemplary of another preferred embodiment of the present invention. In FIG. 7, there is shown the minimum detail robot 60, which is a simplification of robot 50, also having the cockpit texture 56 applied. The minimum detail robot 60 was designated by the artist as having a like named group as the robot 50. It was also designated by the artist as requiring the same material applications as the robot 50 to the similarly named group. Once these two designations have been completed, the principles of the present invention provide that the materials of the robot 50 are applied by the computer to the minimum detail robot 60 at the locations of named groups having like designations, such as the noses 51 & 61.

The cockpit texture 56 is thus projected onto the nose 61, of the minimum detail robot 60, by the computer in the same was that it was originally applied by the artist to the nose 51 of the robot 50.

Note that the designation by the artist that robot 60 required the same material applications as the robot 50 could be specified explicitly (as described more fully below). In another embodiment, the specification by the artist can be implicit, e.g., a file naming convention for object geometry data files. More specifically, the name of the file containing the data for robot 60 can be related to the name of the file containing the data for robot 50 in a manner which allows the computer to automatically detect that robot 60 requires the same material applications as did robot 50.

For example, robot 50 is contained in an object data file named "MADCAT.OBJ". Data representative of the material applications for robot 50 is contained in a file named "MADCAT.APL". The robot 60 is contained in file "MADCAT_3.OBJ" (perhaps indicating that it is the third iteration of level of detail reduction). It is a simple matter to delete the "_3" designation from the last file name to determine that of the first. By altering the three letter extension ".OBJ" to ".APL", the material application data is found and may be used.

Note also in this arrangement that the robot 60 could have a collection of its own material applications which override some or all of those from robot 50. If a file named "MADCAT_3.APL" existed, it could contain data for material applications which are unique to robot 60. The materials applications from robot 50 would first be applied, subsequently, materials applications which override or are in addition to those from robot 50 would be used.

Similarly, it is possible to automatically modify the materials application by naming convention. For example, objects intended to be viewed at a greater distance include less detail (as robot 60 is a low detail version of robot 50). It is preferred that an object with a texture, when viewed at a distance, be rendered with a filtered version of that texture. The filtering reduces the high spatial frequency content of the texture image to minimize the scintillation caused by Moiré interference between the pitch of the pixels in the rendered image and the pitch of the texels in the texture image. For example, if the cockpit texture image 56 is contained in a file named "COCKPT.IMG", the filtered version appropriate for a lower level of detail model could be contained in a file named "COCKPT_3.IMG". An alternative implementation of this is to have a procedure automatically invoked which produces the filtered version of the cockpit texture image 56 when it is applied to lower detail robot 60. In this case, additional data can be included with the material application data to indicate what degree of filtering in appropriate.

Information regarding the application of the cockpit texture 56 to the named group designated as the nose 51 of the robot 50 is stored as data in a material application file. This information refers to a separate data structure which has recorded the procedure for application of the material to a named group of an object. Because the application of the cockpit texture 56 to the nose 61 is executed by the computer using this stored data, it operates without human participation, and so the time required is significantly reduced, and the opportunity for human error no longer exists.

Referring to FIG. 8, there is shown a data flow diagram which discloses the function of each of the major components of the preferred embodiment of the present invention, and the relationship between them.

When the artist begins, he must create an object in 3D from polygons using the object editor 110. The data representative of this object will be stored as master object 100. Subsequently, the master object 100 can be re-read by the object editor 110 and the artist can alter the object. In object editor 110, the object will typically have groups of named polygons which are named according to function. For example, for a robot, typical groups would be those comprising an arm, leg, nose or other such part. The geometry editing features of Wavefront Technology's. Advanced Visualizer™ product is an example of object editor 110, and their ".OBJ" file format is an example of a non-volatile storage format for master object 100.

Another preliminary activity of the artist is the creation of at least one material. For this he uses the material editor 112. A material may comprise one or more attributes used to modify the look of a surface (such as a polygon) to which it is later applied. In the material editor, the artist can create and manipulate texture images, and specify material attributes. The results of this activity is stored as material 106. Usually a material which includes a texture is stored as two components, the texture image and the material data which references that texture image. These components are referred to collectively as material 106. Subsequently, the material 106 can be re-read by the material editor 112 and the artist can alter the material. An example of a material editor 112 would be the material editing features of Wavefront's Advanced Visualizer™ product, with the addition of the image editing program Photoshop, made by Adobe Systems, Inc. of Calif., to perform the editing of texture images. 3Design's ".MTL" file format is an example of a non-volatile storage format for material 106, with the addition of any of several image storage formats (e.g. TIFF) for storing texture images.

After the artist has generated the 3D polygon master object 100, he then applies any 2D material 106 according to named group designations given to parts of the object using object polisher 114. There are two distinct results of this material application process. The first result is a finished object having at least a portion of its 3D geometry embellished with at least one material. Such a finished object can be stored separately, but in practice is usually stored in the place of master object 100. This first result is known in the art and is achievable with the material application features of Wavefront Technology's 3Design program. The second result, in accordance with the principles of the invention, is a record of the material applications. This record is stored as the master object's polisher file 108, and contains data representative of the methodology for applying material 106 to a named group in the master object 100 during the artist's interaction with the object polisher 114. Each such datum contains complete information to allow the material application which generated it to be identically repeated. The nature of such data is described more fully below.

Groups of polygons can be selected and named either in the object editor 110 or the object polisher 114. Further, if one or more polygons are selected in object polisher 114 and a material applied to them, the selected polygons, if not already grouped, can be automatically grouped and named for future reapplications of the material. The artist can be queried for a name, or a name (such as a sequence number) can be provided automatically.

The practice of storing the finished model of the master object 100 in the place of the original model before materials were applied is due to the iterative nature of development of the finished object. The master object 100 will, in practice, be edited by the object editor 110 and object polisher 114 numerous times before a final model is accepted by the artist. Typically, one or more previous versions are automatically stored as backups, in case a geometry edit or material application was afterwards deemed inferior to its predecessor and the artist desires to recover the earlier version.

The master object 100 is typically the artist's first rendering of an object of a particular type, or having a particular geometry, and is usually the most detailed.

Variant object 102 of FIG. 8 indicates data representative of a variation of the master object 100. The variant object 102 may be a simplification, or partially altered version of master object 100. Examples of the latter would be a robot with a standard arm replaced by a special arm, or a aircraft with its gear wells open and its landing gear down, rather than a more efficient master object having no landing gear to be used in flight. Partially altered models would be modified by hand. Simplifications can be made by hand or possibly by automatic process. Such an automatic process is a feature of Wavefront Technology's Advanced Visualizer™, but it operates without the benefit of the aesthetic judgment of an artist and does not always produce acceptable results.

The manual process of creating a variant object involves using the object editor 110 to read master object 100. The artist uses the object editor 110 to produce a simplification or alteration of the master object 100, which is then stored as variant object 102. Typically, the file format of the variant object 102 would be the same as the file format for the master object 100.

Recall that master object 100 consisted initially of 3D polygon geometry which, once it had materials applied by the artist using the object polisher 114, was in the preferred embodiment is overwritten to contain not only the 3D polygon geometry, but also data representative of the materials applied to those polygons. In the same way, the variant object 102 may initially contain geometry without materials applied. To cause the variant object 102 to become a finished model, it is read into object polisher 114, as is the master object's polisher file 108. The data representative of the material applications to named groups of the master object 100 is interpreted to cause like material applications to like named groups in the variant object 102. The performance of this material application is preferably upon explicit manual instruction from the artist, but can easily be made automatic by one skilled in the art. If necessary, additional material applications can be made which are unique to the variant object 102. Such additional material applications would be represented and stored by the object polisher 114 in a variant object's polisher file (not shown). The resulting finished object is preferably stored as the same variant object 102 (but may be stored elsewhere).

It is possible that during the process of constructing a variant object that the material applications to the master object survive the alteration and result in an aesthetically acceptable result. Even in such a case, the present invention remains useful for such case as a material is later edited or some other event requires reapplication of material to geometry.

Another embodiment of the present invention relates to 3D objects similar in some ways to the master object. Typically, these similar objects may be members of the same class of object as the master object, e.g. they all may be robots (but different ones), or they may be different vehicles suitable for a military convoy. Similar objects will share many of the same named groups (e.g. nose, leg, arm, wheel, hood, windshield). Such objects would typically be created by the artist using the object editor 110 and stored as similar object 104. The file format of similar object 104 would usually be the same as the file format for the master object 100.

Application of materials to similar object 104 would be accomplished using the object polisher 114. The master object's polisher file 108 would be read and the data representative of the material applications made to named groups of master object 100 would be made to like named groups of similar object 104. If necessary, additional material applications can be made which are unique to the similar object 104. Such additional material applications would be represented and stored by the object polisher 114 in a similar object's polisher file (not shown).

In an alternate embodiment, several objects could share a single polisher file, those named groups with material applications not in common with other objects being uniquely named.

FIGS. 9, 10, 11, 12, 13, 14, and 15 illustrate the results of processes in FIG. 8.

Referring now to FIG. 9, there is shown a material 106 such as might be generated with material editor 112. The eagle texture image 70 is bounded by a reference frame 72. The reference frame 72 delimits what is referred to in the art as the u-v coordinate system of the texture. In the art, u-v is use instead of x-y to define the axes of the texture coordinates. This is so they are not confused with the x-y of a 3D object's x-y-z coordinate system. The u axis maps the values zero to one from the left edge of the texture image to the right, while v maps zero to one from the bottom to the top. This texture material is exemplary of a 2D material to be applied to a 3D polygon model.

In FIG. 10, the ankle joint 53 of robot 50 (of which only the lower leg is shown here) is composed of polygons 54. The robot 50 is oriented to place both ankle joints 53 inline with the orthographic side view shown in FIG. 10. The eagle texture image 70 appears normal sized and undistorted in its reference frame 72.

In FIG. 11, the eagle texture 70' is rotated and stretched by the artist's manipulation of its rotated and stretched reference frame 72'. The artist selects the named group containing ankle joint 53. This selects all polygons 54 which are members of that named group, including those which cannot be seen from this view. The artist then explicitly causes the eagle material to be applied to the selected polygons.

Figure 12:
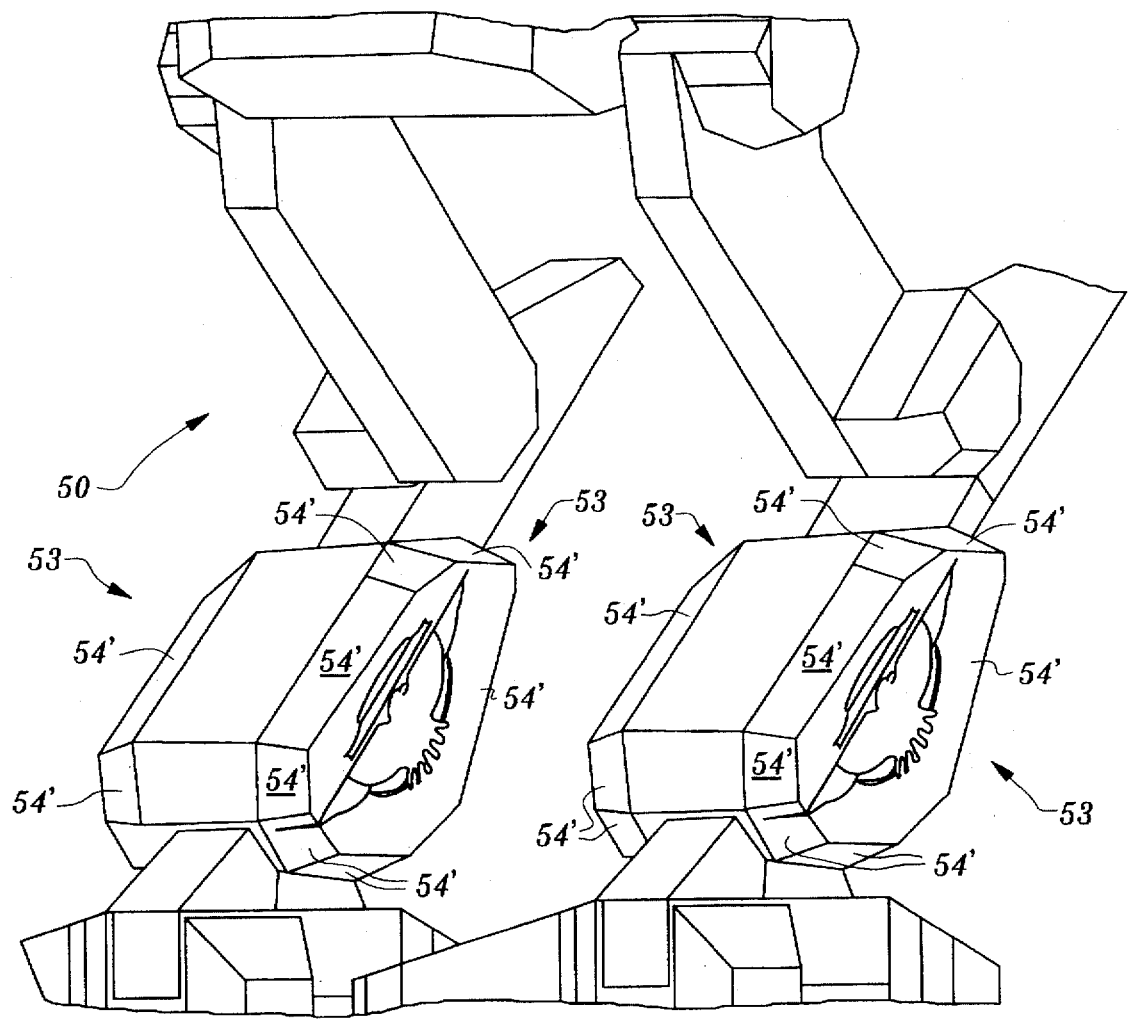
FIG. 12 shows a perspective view of an exemplary three dimensional robot and illustrates the exemplary texture of an eagle of FIG. 9, as applied onto an ankle joint from the side orientation as in FIG. 11, in accordance with the principles of the present invention.

FIG. 12 shows a different view of robot 50, after the eagle material has been applied in FIG. 11. From this view both ankle joints 53 are visible. Ankle joints 53 are now comprised of finished polygons 54' which have eagle texture applied to them.

Figure 13:
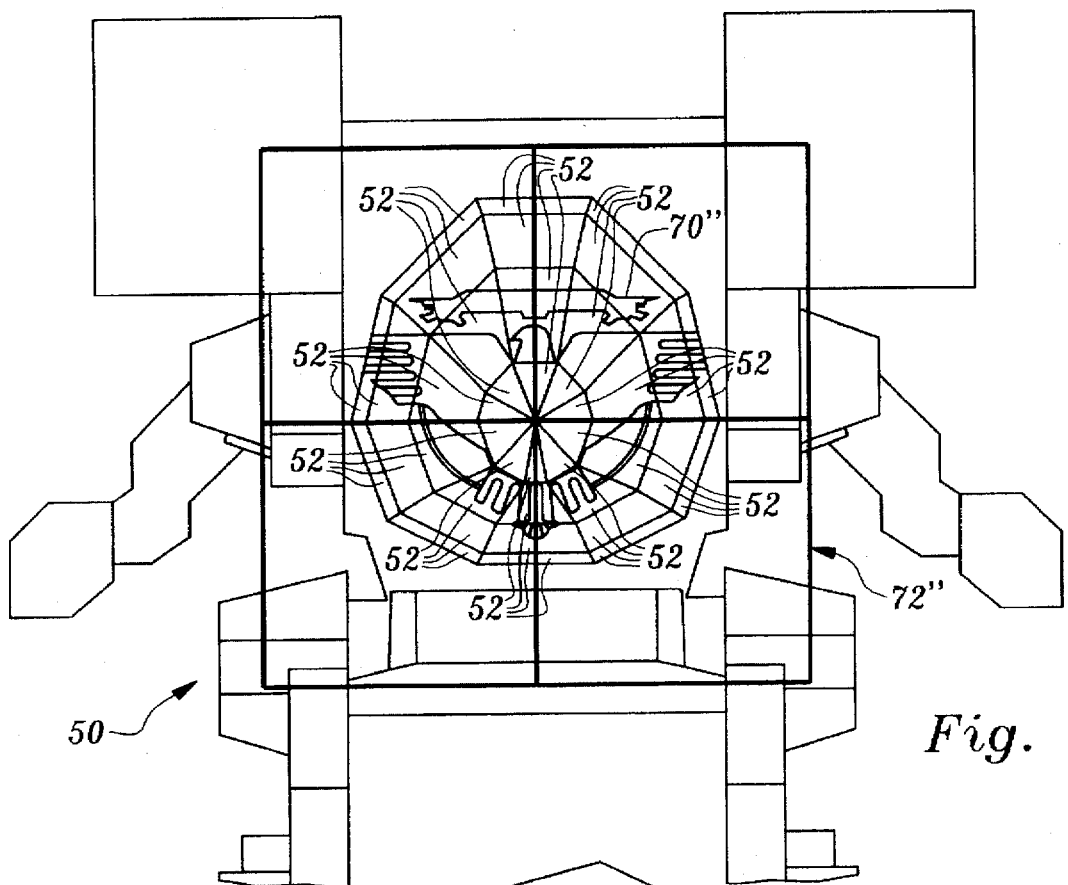
FIG. 13 illustrates the exemplary texture of an eagle of FIG. 9, magnified, projected onto and applied to the protruding nose, shown in front view, of the exemplary three dimensional robot of FIG. 1, in accordance with the principles of the present invention.

FIG. 13 is a front facing orthographic view of robot 50 showing an expanded reference frame 72" having been manipulated by the artist to produce an expanded eagle texture image 70" aligned over the selected named group comprising nose polygons 52. With this alignment, the artist explicitly causes the eagle material to be applied to the selected polygons. In this position, the artist also saves the material application for the named group "nose" at this time.

Figure 14:
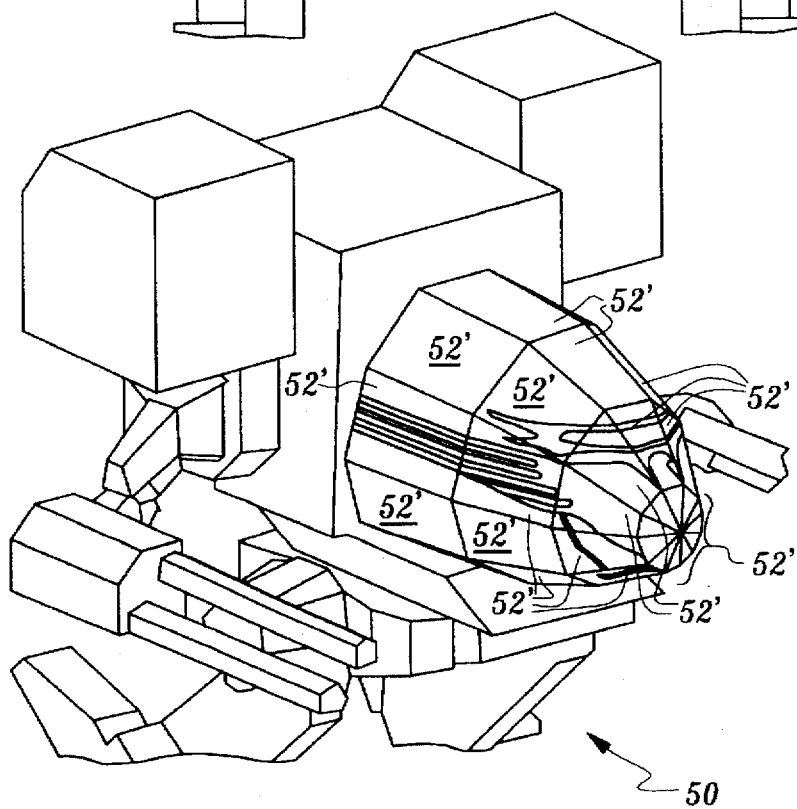
FIG. 14 shows a perspective view of an exemplary three dimensional robot and illustrates the exemplary texture of an eagle of FIG. 9, as applied onto the protruding nose from the front orientation as in FIG. 13, in accordance with the principles of the present invention.

FIG. 14 shows a different view of robot 50, after the eagle material has been applied in FIG. 13. The nose group is now comprised of finished polygons 52' & 52". From this view, note the elongation of the eagle wing tips on the finished polygon 52". This illustrates the nature of the projection of the eagle texture image 70 in FIG. 13: In the projection, each vertex of the selected polygons map to a point in the u-v coordinate system of the texture image. Because the projection in FIG. 13 so foreshortens polygons nearly parallel to the axis of projection, the texture image is severely stretched when applied, as seen in polygon 52". Further, note that the tip of the eagle wing, which comes to a point, does not appear on polygons 52' & 52". That region of the texture image when projected did not intersect any of the selected polygons. Other modes of texture application are known in the art and supported by this invention, such as repeating textures, where equivalent u-v coordinates that lie outside the {(0,0),(1,1)} rectangle are mapped back into that rectangle by a modulo or other function.

Figure 15:
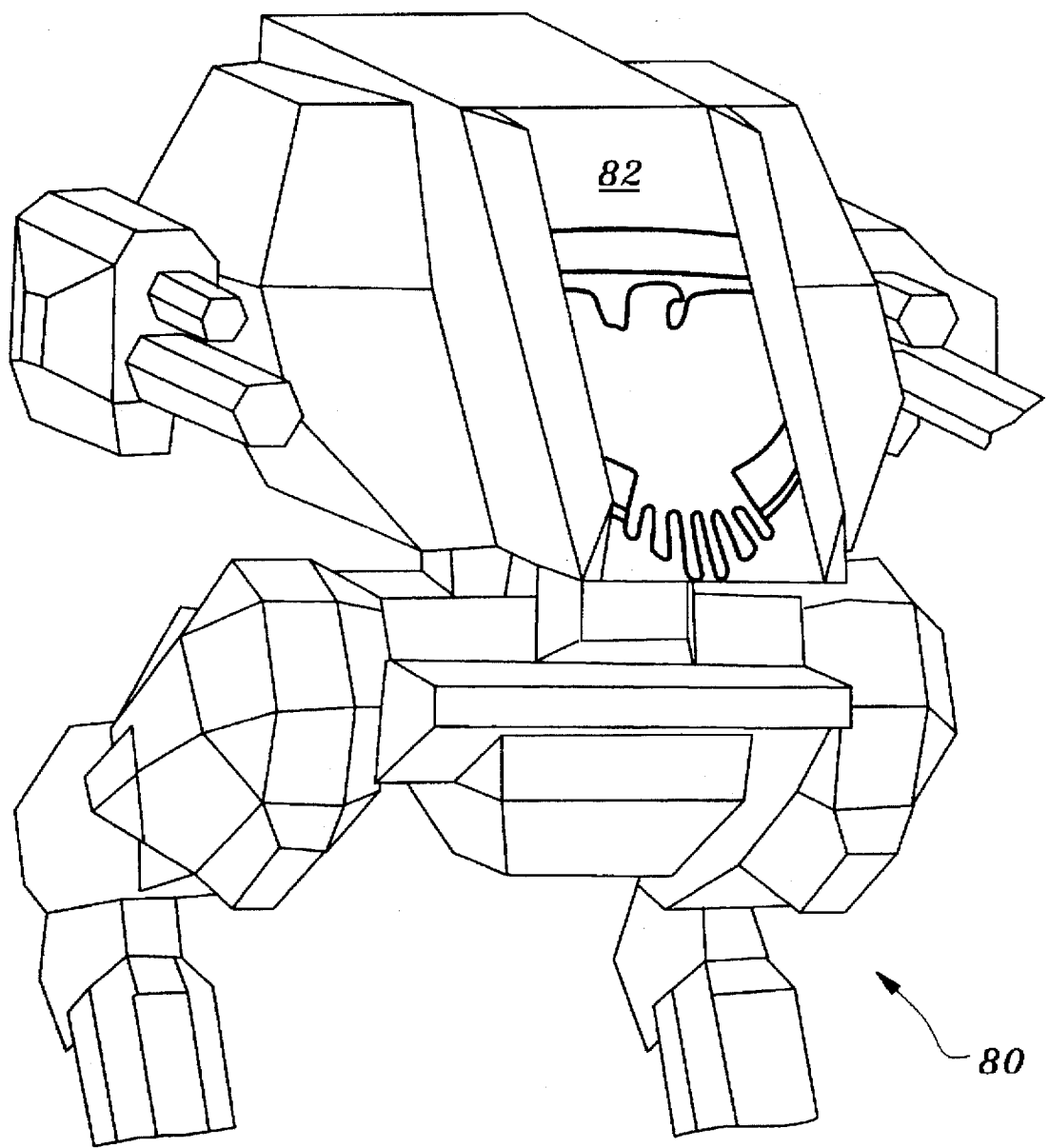
FIG. 15 shows a perspective view of another exemplary three dimensional robot having a flat nose and illustrates the exemplary texture of an eagle of FIG. 9, as applied onto the flat nose from the front orientation, in accordance with the principles of the present invention.

In FIG. 15, the material application for the named group "nose" is recalled from the description of FIG. 13 above. With the data representing robot 50 exemplary of master object 100, and the record of the material application exemplary of master object's polisher file 108, this would allow object polisher 114 to cause (either automatically or upon manual command) the eagle texture image 70, exemplary of material 106, to be applied to the named group "nose" comprising polygon 82 of second robot 80, whose representative data would be exemplary of similar object 104. The result shown in FIG. 15 has the eagle texture applied to the flat nose of robot 80. Data representative of this result would typically replace the original data for robot 80 as similar object 104.

Figure 16:
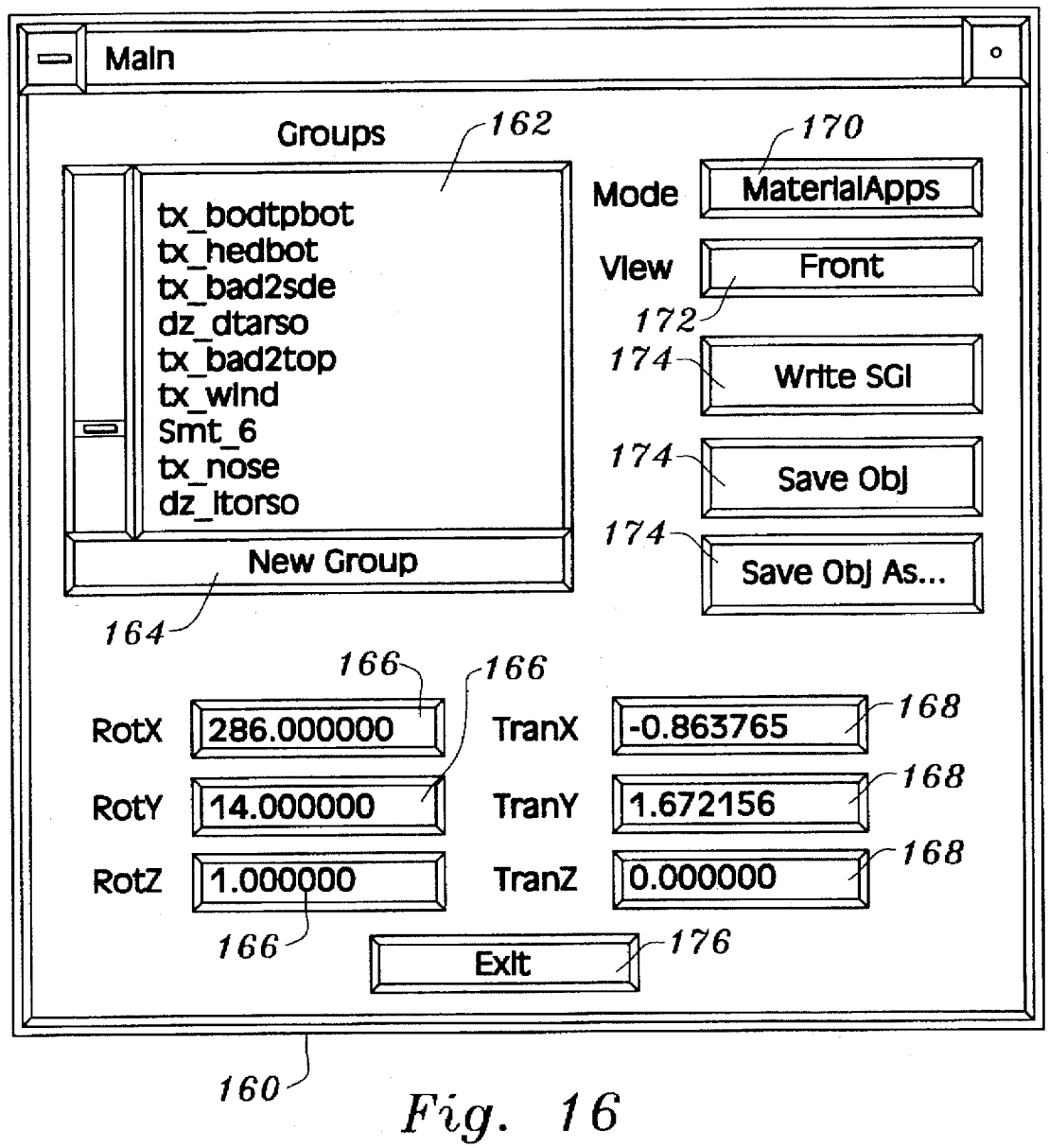
FIG. 16 illustrates an exemplary user input screen for creating and/or selecting from a three-dimensional object a named group comprising one or more polygons, for controlling the view of that object and named group, and for storing that object and all of its named groups.

FIGS. 16, 17, 18, and 19 are drawings representing a user interface for the object polisher 114. In FIG. 16, the main window 160 is shown. This interface assumes that the object polisher 114 was invoked in a manner which identified and loaded the model considered master object 100.

Group list 162 lists all of the named groups in master object 100. A graphic window adjacent to main window 160 would presently show a view of the robot 50 similar to FIG. 14. Use of a pointing device such as a mouse would allow the artist to select a group from group list 162 which would cause the polygons of the group, if visible in the graphic window, to be drawn highlighted. The same pointing device would allow the artist to manually select polygons in the graphic window by known means. Once a group of polygons is selected, the new group button 164 can be clicked to begin a dialog to define a name for a new group comprising the selected polygons.

The axes of the 3D objects in the example implementation of the object polisher user interface are as such: X is up, Y is to the object's left, and Z is out the object's back. Thus, the labels of the rotation fields 166 are interpreted as: RotX is yaw to the right, RotY is pitch down, and RotZ is roll left. The rotations shown in rotation fields 166 correspond to rotations applied to robot 50 for a view similar to FIG. 14.

The labels of the translation fields 168 are interpreted as: TranX is movement up, TranY is movement left, and TranZ is movement back. The translations shown in translation fields 168 correspond to the translations applied to robot 50 for a view similar to FIG. 14.

The mode button 170, when pressed, reveals a menu allowing the artist to switch modes between applying materials (labeled as "MaterialApps"), and strictly viewing the object under various known rendering methods: textured, flat shaded, lighted, and wireframe.

The view button 172, when pressed, reveals a menu allowing the artist to force a particular predefined view into the rotation fields 166 and translation fields 168. Example predefined views are front (shown in view button 172 as the last predefined view selected), right side, left side, rear, top, and isometric.

Save buttons 174 allow the resulting finished object to be stored as a file with various options. A finished object can be stored as an file format native to the machine on which the object polisher is running. In this example, "Write SGI" refers to a file format native to a Crimson workstation by Silicon Graphics, Inc. of Mountain View Calif., which is a binary format which would be the more compact alternative, and thus good for archiving objects. A finished object would by default be stored under its original name in a format native to the object editor 110, which for Wavefront Technology's Advanced Visualizer™ is the ".OBJ" format, hence the "Save Obj" label on one of the save buttons 174. Finally, one might wish to save a version of the file in the native format, but not overwrite the master object 100. In this case, the "Save Obj As . . . " save button 174 will prompt the artist for a new filename to use for the save.

Exit button 176 first verifies that the artist has saved his work appropriately, and then terminates the object polisher 114.

Figure 17:
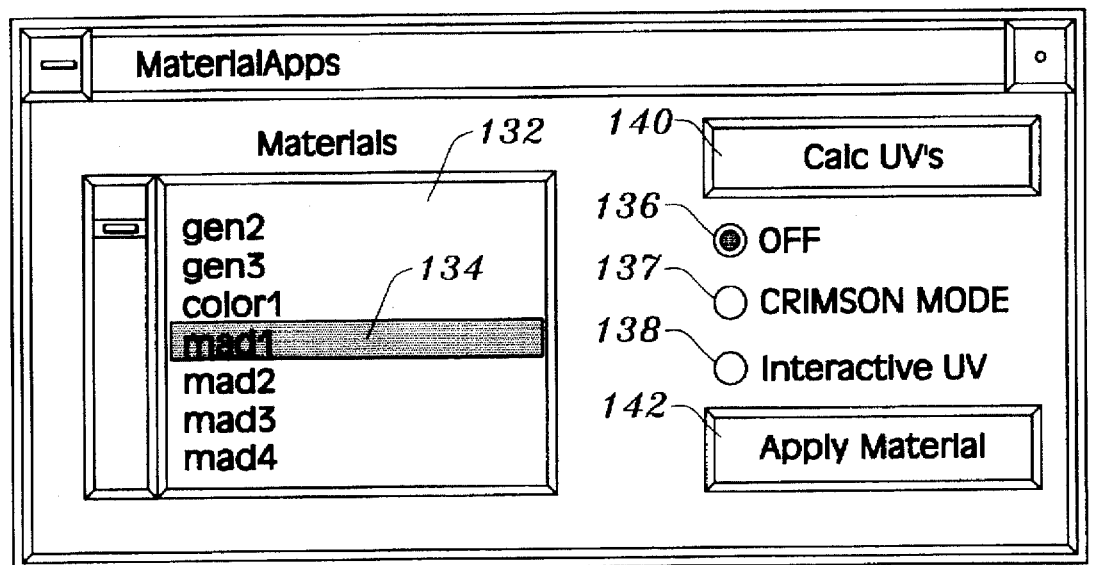
FIG. 17 illustrates an exemplary user input screen for selecting a material, for controlling the update of the projection of the selected material onto the selected polygons, and for applying the selected material to the selected polygons according to the projection, in accordance with one embodiment of the present invention.

FIG. 17 shows material application window 130, an exemplary interface for selecting and applying materials. The materials list 132 lists all available candidates for material 106. The selection 134 in this example corresponds to the cockpit texture image 56.

Exactly one of radio buttons 136, 137, and 138 are selected at a time. The selection of one deselects all of the others. As a group, they control the real-time application of texture, if texture is used in any of the materials already applied or currently projected on the object in the graphic window. In this embodiment, it is presumed that the graphic window can update a wireframe or shaded object in realtime. It contemplates that only the texture rendering process may take a long time. If real-time texture is off, (radio button 136 selected), then rendering takes place as wireframe or shaded object without texture. Applied and projected texture is added only when the calculate u-v's button 140 is clicked. This mode is useful if a number of material applications are being automatically or manually applied and the machine on which the object polisher is running does not have a fast hardware texture, since there will be now waiting for the application of texture at each step (which can be slow). If real-time texture is in interactive mode (radio button 138 selected), then whenever manipulation of the object and the projection stops for more than about 3 seconds, the textures are drawn. This mode is useful for a machine without fast hardware texture (as above), but during manual manipulation of the object or projection. Several movements and minor adjustments in quick succession are not interrupted by a texture redraw, and when a manipulation is complete, the texture draw begins within a short period. Radio button 137 is selected only if the machine on which the object polisher is running has fast real-time texture rendering, since it attempts to draw the object as frequently as possible. If the rendering was not faster than perhaps 5 or 10 hz, then it would be very difficult to adjust the position of the object or projection of the texture since adjustments of any size would tend to be interrupted by a relatively long process of the texture redraw.

The discussion will return to the apply material button 142, below.

Figure 18:
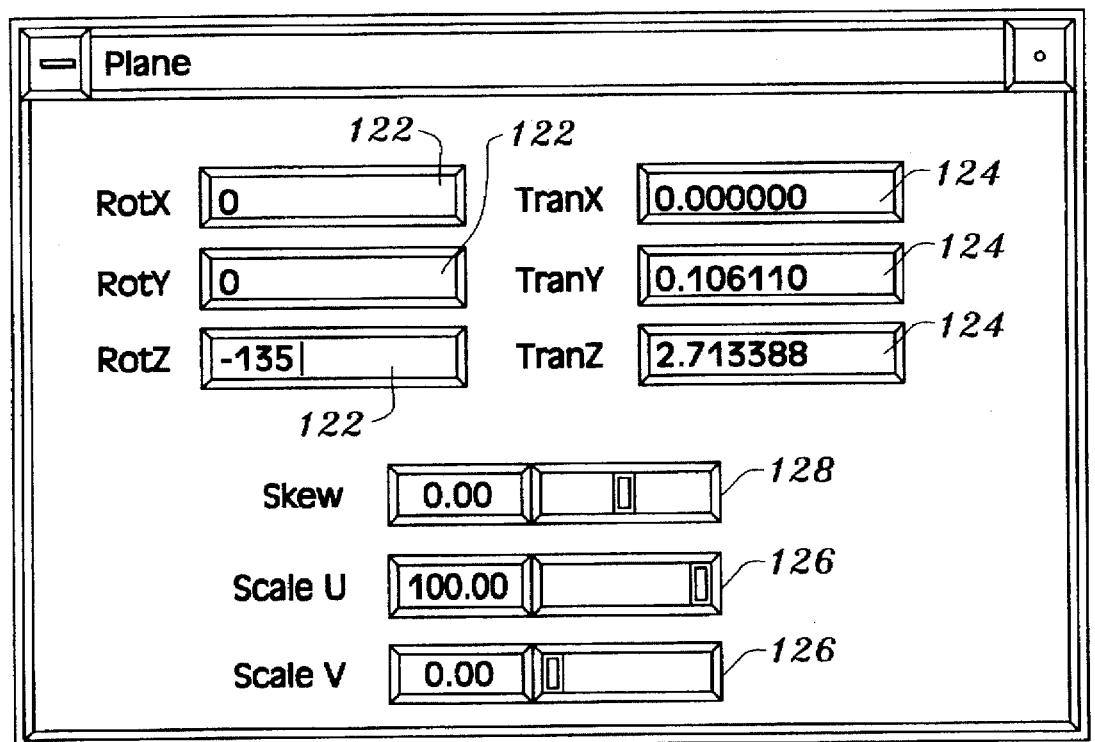
FIG. 18 illustrates an exemplary user input screen for positioning, rotating, and distorting the projection of the selected material with respect to the current view of the object, included the selected polygons, in accordance with the principles of the present invention.

FIG. 18 shows material projection window 120. Its settings correspond to the rotation and elongation of the reference frame 72' of FIG. 11.

Rotation fields 122 control the rotation of the reference frame relative to the viewpoint. In the example settings shown in FIG. 18, the only rotation field 122 used is labeled RotZ, whose setting corresponds to the counter clockwise roll of the eagle texture 70'. Translation fields 124 adjust translation of the reference frame with respect to the viewpoint, in the example placing the reference frame in front of the viewpoint of FIG. 11 and slightly to the left of center.

Scale sliders 126 allow the u-v axes of the texture to be scaled up independently. In FIG. 11 and FIG. 18, the scale of the u axis of the reference frame and eagle texture has been increased by 100%, making it twice the size of the v axis. The skew slider 128 can apply a rhomboidal distortion to the reference frame and texture, but this additional distortion is not applied to texture 70'.

A brief recap has a group named and selected in group window 160, a material selected in material window 130, the projection adjusted in material projection window 120, and ultimately viewed by appropriate selecting or clicking of buttons 136, 137, 138, or 140. Providing that the results of the projection seem satisfactory, the artist will command the material to be applied to the object by clicking apply material button 142. This adds to the object's data structure the results of that material application.

Figure 19:
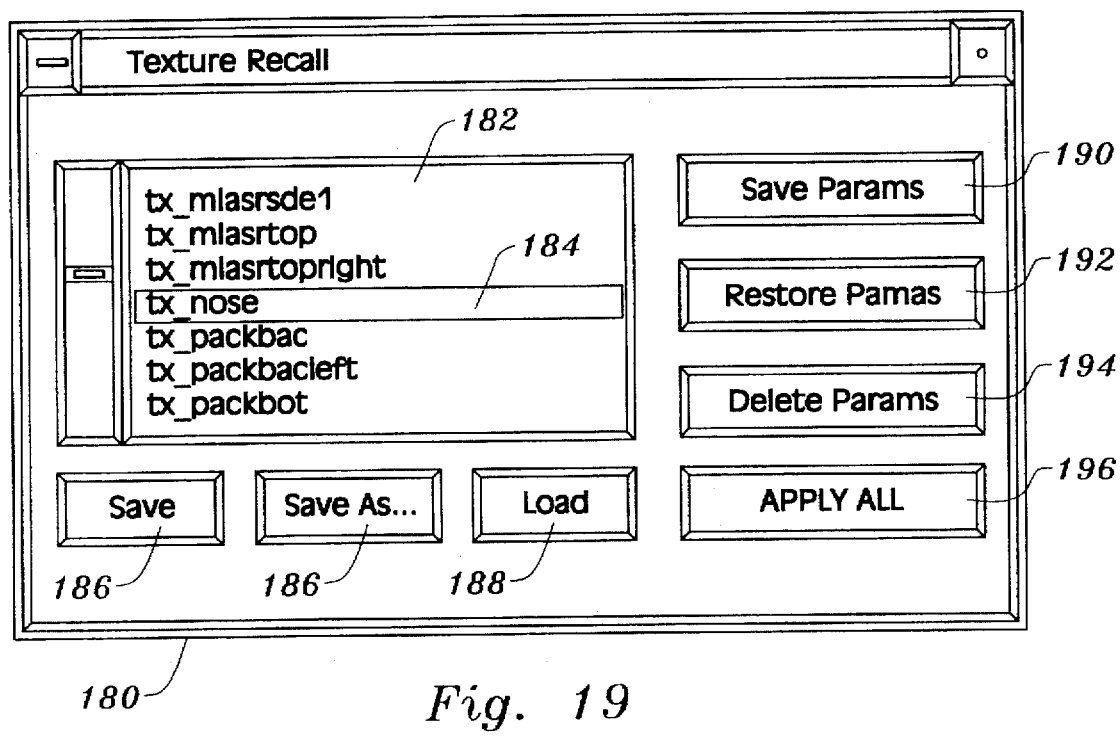
FIG. 19 illustrates an exemplary user input screen for storing or recalling the data representative of a selected material, object orientation, and projection relative to that object orientation, in accordance with the principles of the present invention.

Additionally clicking the save parameters button 190 in FIG. 19 records all of the parameters that produced the most recent material application (i.e. the last time the apply material button 142 was pressed): projection rotation, translation, scaling, skew; material selection; named group (s) selected and object translation and rotation. This material application is stored, preferably, but by no means necessarily, under the name of the named group selected. (The choice of storing under the named group selected is one of convenience. It relieves the artist from having to specify a name for each application and it is usually a name meaningful in context—and frequently the name the artist would have chosen anyway.)

In an alternative embodiment, clicking apply material button 142 would additionally perform the functions of the save parameters button 190. It is preferred to keep these functions separate to allow the artist to, for example, examine the object from different viewpoints before committing to record the material application.

FIG. 19 shows the material application window 180. The material application list 182 lists all of the material application records in the master object's polisher file 108 and the optional variant or similar object's polisher file (not shown). Currently selected material application 184 is highlighted.

The collection of material applications listed in material application list 182 may be stored by clicking either of save buttons 186.

An additional set of material applications may be loaded by clicking load button 188. This would be a method for identifying the master object's polisher file 108 appropriate for a similar object 104.

The restore parameters button 192 is clicked to reapply a material to a named group as described by the currently selected material application 184.

The delete parameters button 194 is clicked to delete the currently selected material application 184.

The apply all button 196 applies a material to a named group as described in each material application in material application list 182.

In the preferred embodiment, at the time that apply material button 142, restore parameters button 192, or apply all button 196 is pressed, a validation check is made to insure that the material application is a valid one. For example, some 3D graphic rendering devices limit the maximum u-v coordinate values (e.g. the pixel planes rendering engines produced by Division, Ltd. of Bristol, England limit the u-v coordinate values to the range zero to four). Preferably, at the point an error is detected, the artist is given an opportunity to go ahead with the material application, or to skip it.

If the material application proceeds and contains an error, the selected polygons are made members of the named group "error$_{13}$ u_v_limits". This is an additional membership, and does not alter their membership in any other group.

Similar validity checks with similar results can be performed whenever an object is read, for example when master object 100 is loaded into object polisher 114. Such additional checks can test for data which may be toxic to the target rendering system, or for items which simply violate testable design rules. Some rendering systems do not tolerate the first three vertices in a polygon to be colinear, since the dot product of the first two edges is used to define the normal for the polygon's facing. A polygon containing such a violation would be added to the named group "error_colinear". An example of design rules which might be tested for would be polygons with a maximum dimension smaller than a design specified minimum, or a pair of coplanar, adjacent, combinable polygons which (for efficiency) should be a single polygon. Such violations would be made members of a named group "warning_xxx" where "xxx" is an appropriate, meaningful name.

The utility of the additional named group memberships is that the artist can be informed that an object contains errors or warnings. If he wishes, he can select the associated named groups and view the member polygons as they become highlighted. In this manner, the exact polygon(s) and the type of error is immediately brought to the attention of the artist, and he can take steps to correct it.

It is also useful in many circumstances for the artist to be able to ignore errors and warnings, for example during a period of rapid prototyping—the 3D equivalent of making a rough sketch of an object. The artist is made aware of that error or warnings are detected, however, he may choose to ignore them and get the store the object in its imperfect form anyway.

The exact nature of what constitutes an error or a warning is strongly dependent on the target system. It is not uncommon for an object which displays perfectly on one system or piece of software to crash a different system or software package. Thus, someone skilled in the art must examine the documentation of the target rendering system or the artist defined design rules and create tests for those configurations of data which are not wanted. It is anticipated that a large library of such tests will be accumulated, and that only a fraction will be of interest for any given target platform. For example, the Division, Ltd. image generator noted above will not tolerate a u-v less than zero or greater than or equal to four, since their texturing algorithms will not represent negative numbers or numbers greater than or equal to four. However, that limit is not imposed on an object rendered by a Silicon Graphics graphics workstation.

The processing power of the present invention will vary from application to application. However, the principles of the present invention can be used on any commercially available computer with sufficient power. Moreover, although the present invention is disclosed using software modules, it may also be implemented, in whole or in part, using hardware.

Although the principles of the present invention are disclosed in the context of a simulation environment, these principles are generally applicable to objects generated in any computer graphics environment. It is thus intended that the invention cover all modifications and embodiments which fall within the spirit and scope of the invention. Thus, while preferred embodiments of the present invention have been disclosed, it will be appreciated that it is not limited thereto but may be otherwise embodied within the scope of the following claims.

The particular architecture and features of the user interface will depend on the operating system of the computer workstation and the software code generated for the interface. It is not necessary to describe the details of such programming to permit a person of ordinary skill in the art to implement a user interface suitable for incorporation in a computer system within the scope of the present invention. The details of the software design and programming necessary to implement the principles of the present invention are readily understood from the description herein.

Source code for an exemplary program is included in the file wrapper. This source code contains procedures demonstrating an implementation of various aspects of the present invention. This source code is written in the C++ programming language for use on a Silicon Graphics, Inc. workstation supporting Silicon Graphics' GL graphics library and IRIX operating system. The preferred embodiments of the present invention incorporate a variety of different data structures and procedures. It is understood that flexibility in performing user-guided tasks involving these various data structures and procedures is incorporated as a part of the present invention.

We claim as our invention:

1. A method of facilitating material application for a group of objects of a computer graphic comprising the steps of:

defining a group of objects;

representing a first object from said group of objects, said first object having a geometry within a coordinate system of a computer graphic, said first object comprised of at least one component;

designating said component as a first named component by assigning a name to said component;

creating a material which defines a surface quality;

creating a material application, said material application comprising data specifying said material and the manner in which using said material is to be applied;

using said material application for applying said material to said first named component;

storing said material application;

representing a second object from said group of objects, said second object having a geometry within a coordinate system of a computer graphic, said second object comprised of at least one component;

designating said component of the second object as a second named component, by assigning the name to said component so that the name is assigned to both the first named component and the second named component;

designating the malarial application for said second named component because said second named component has been assigned the name;

using said material application for applying said material to said second named component.

2. The method of claim 1 wherein said first object having a geometry is represented using a modeling tool which constructs the geometry of the object from a number of polygons.

3. The method of claim 1 wherein said second object having a geometry is represented using a modeling tool which constructs the geometry of the object from a number of polygons.

4. The method of claim 1 wherein said first object and said second object having a geometry are represented using a modeling tool which constructs the geometry of the object from a number of polygons.

5. The method of claim 1 wherein the material application is a texture mapping.

6. The method of claim 1 wherein the material application is a light reflection model.

7. The method of claim 1 wherein the material application is a color.

8. The method of claim 1 wherein the material application is a bump mapping.

9. The method of claim 1 wherein the material application is an environment mapping.

10. The method of claim 1 wherein the material application is a combination of a color and a texture mapping.

11. The method of claim 1 wherein the material application is a combination of a color, light reflection model and a texture mapping.

12. A method of facilitating material application for a group of objects of a computer graphic comprising the steps of:

defining a group of objects;

representing a first object from said group of objects, said first object having a geometry within a coordinate system of a computer graphic, said first object comprised of at least one component, said component having an intrinsic quality;

designating said component as a first component by assigning a name to said component;

creating a material which defines a surface quality;

creating a material application, said material application comprising data specifying said material and the manner in which said material is to be applied;

using said material application for applying said material to said first component;

storing said material application;

representing second object from said group of objects, said second object having a geometry within a coordinate system of a computer graphic, said second object comprised of at least one component having the intrinsic quality;

designating said component of the second object as a second component;

designating the material application for said second component because said second component has the intrinsic quality;

using said material application for applying said material to said second component.

13. The method of claim 12 wherein the intrinsic quality is a conjugate of the component of an object.

14. The method of claim 12 wherein the intrinsic quality is an orientation of the component of an object.

15. The method of claim 12 wherein the intrinsic quality is a component size of the component of an object.

16. A method of facilitating material application for a group of objects of a computer graphic comprising the steps of:

defining a group of objects;

representing a first object from said group of objects, said first object having a geometry within a three dimensional coordinate system of a virtual environment, said first object comprised of at least one component;

designating said component as a first named component by assigning a name to said component;

creating a material which defines a surface quality;

creating a material application, said material application comprising data specifying said material and the manner in which said material is to be applied;

using, said material application for for applying said material to said first named component;

storing said material application;

representing a second object from said group of objects, said second object having a geometry within a three-dimensional coordinate system of a virtual environment, said second object comprised of at least one component;

designating said component of the second object as a second named component, by assigning the name to said component so that the name is assigned to both the first named component and the second named component;

designating the material application for said second named component because said second named component has been assigned the name;

using said material application for for applying said material to said second named component.

17. The method of claim 16 wherein the representation of the first object and the second object uses the polygon mesh model.

18. A method of facilitating material application for a group of objects of a computer graphic comprising the steps of:

defining a group of objects, said objects each having at least one component;

creating a material which defines a surface quality of a component of an object from said group of objects;

creating a material application, said material application comprising a data structure which specifies said material and the manner in which said material is to be applied;

storing the material application;

repeating the process of;

representing an object from said group of objects having a geometry within a three-dimensional coordinate system of a virtual environment;

designating the material application for said component;

using said material application for applying said material to said component.

19. The method of claim 18 wherein the object having a geometry is represented using a modeling tool which constructs the geometry of the object from a number of polygons.

20. The method of claim 18 wherein the material specified is a texture mapping.

* * * * *